United States Patent
Tanaka

(10) Patent No.: US 7,405,768 B2
(45) Date of Patent: Jul. 29, 2008

(54) APPARATUS AND METHOD FOR DETERMINING IMAGE REGION

(75) Inventor: Tetsuro Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 535 days.

(21) Appl. No.: 10/988,319

(22) Filed: Nov. 12, 2004

(65) Prior Publication Data
US 2005/0122434 A1 Jun. 9, 2005

(30) Foreign Application Priority Data
Nov. 14, 2003 (JP) ............................ P2003-385226

(51) Int. Cl.
H04N 7/01 (2006.01)
H04N 11/20 (2006.01)
H04N 5/14 (2006.01)
H04N 9/64 (2006.01)

(52) U.S. Cl. ...................... 348/452; 348/448; 348/701
(58) Field of Classification Search ................ 348/441, 348/448, 452, 700, 701; 382/107, 236
See application file for complete search history.

(56) References Cited

U.S. PATENT DOCUMENTS

| 6,226,388 | B1 * | 5/2001 | Qian et al. ................... 382/103 |
| 6,792,156 | B2 * | 9/2004 | Lee ............................. 382/249 |
| 6,898,243 | B1 * | 5/2005 | Alvarez ................. 375/240.14 |
| 7,170,562 | B2 * | 1/2007 | Yoo et al. .................... 348/452 |
| 2001/0021274 | A1 * | 9/2001 | Lee ............................. 382/240 |
| 2004/0160529 | A1 * | 8/2004 | Nagakura et al. ........... 348/452 |
| 2005/0078214 | A1 * | 4/2005 | Wong et al. ................. 348/452 |
| 2005/0105765 | A1 * | 5/2005 | Han et al. .................... 382/100 |
| 2005/0253963 | A1 * | 11/2005 | Wong ........................ 348/452 |
| 2006/0007250 | A1 * | 1/2006 | Jung et al. ................... 345/690 |
| 2006/0152620 | A1 * | 7/2006 | Morita ....................... 348/448 |
| 2007/0071342 | A1 * | 3/2007 | Bilbrey et al. ............... 382/254 |

FOREIGN PATENT DOCUMENTS

| JP | 5 41855 | 2/1993 |
| JP | 8 65550 | 3/1996 |
| JP | 2002 185933 | 6/2002 |

* cited by examiner

Primary Examiner—Brian P Yenke
(74) Attorney, Agent, or Firm—Frommer Lawrence & Haug LLP; William S. Frommer; Thomas F. Presson

(57) ABSTRACT

A determining portion first determines which an interpolation pixel position (a target position of image signal) which is positioned in a field that precedes a current field by one field is included in a motion region or a still region by using an image signal of current field and an image signal of two fields before to obtain a determine result of this time. The determining portion finally determines which the interpolation pixel position is included in a motion region or a still region based on the determined result of this time and the history information, which is read out of a memory through a history-information-read-processing portion, on a determined result of past predetermined times(s) corresponding to the interpolation pixel position to obtain a determined result. The memory stores the history information on a determined result of past predetermined times(s) corresponding to each interpolation pixel position.

10 Claims, 8 Drawing Sheets

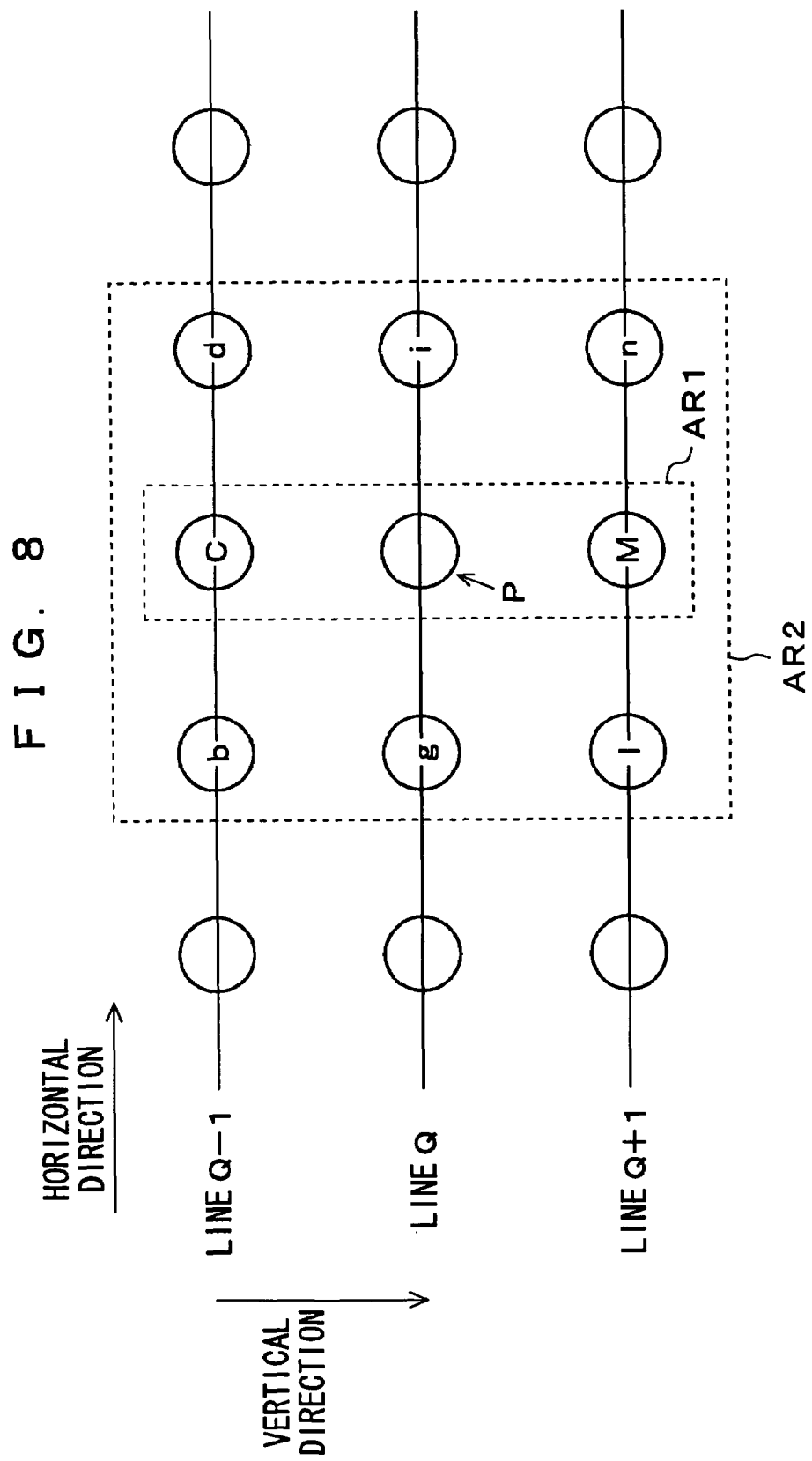

APPARATUS AND METHOD FOR DETERMINING IMAGE REGION

BACKGROUND OF THE INVENTION

1. Field of the Invention

The invention relates to an apparatus and a method for determining image region. More particularly, it relates to an apparatus and a method for determining that a target position of the image signal is included in either a motion region or a still region, and an apparatus and a method for processing an image signal.

2. Description of Related Art

An interlace-scheme image signal (interlaced signal) is employed in various image signals used in a television apparatus, a video apparatus and the like. A progressive-scheme image signal (progressive signal), on the other hands, is employed in image signals used in a computer. Thus, for example, in order to display images for the computer and the television on a computer display screen, the interlaced signal is converted into the progressive signal.

Since the interlaced signal constitutes a signal of one frame in which signals of lines are arranged one after the other as signals of odd field and even field, a flicker noise occurs if a fine horizontal line stays in an image. No flicker noise, however, occurs in the progressive signal along which a fine image is displayed even if a fine horizontal line stays in an image. In a recent case, a home-use television apparatus may convert the interlaced signals into the progressive signals therein and displays an image according to the progressive scheme.

According to the interlaced signal, one frame is composed of two fields of odd and even in which line signals are shifted to each other at intervals of one line, as shown in FIG. 1. If a conversion of such the interlaced signal into the progressive signal, namely, a so-called interlace-progressive (IP) conversion is performed, interpolation data (pixel data) is created on each line that includes no pixel data.

In this case, as shown in FIG. 2, motion detection processing is generally performed so that an image signal is divided into a motion region and a still region. In the motion region, the interpolation data is created from items of the pixel data, a1 and a2, of back-and-forth lines within the same field. In the still region, the interpolation data is created from items of the pixel data, b1 and b2, of the lines similar to each other within the back-and-forth fields.

Conventionally, relative to the motion detection processing in the IP conversion, for example, when an interpolation pixel position P is positioned in a field that precedes a current field by one field, as shown in FIG. 2, an absolute value of the difference data between pixel data "e" of a pixel position in the current field that corresponds to the interpolation pixel position P and pixel data "a" of a pixel position in a field that precedes the current field by two fields (or one frame) has been obtained as frame motion information (frame motion information for a target field). This absolute value of the difference data has been compared with a threshold value so that it can be determined that the corresponding interpolation pixel position P is included in either a motion region or a still region.

In a case where it is determined that the corresponding interpolated pixel position P is included in either a motion region or a still region by using only the frame motion information of the target field as described above, it may be accidentally determined that it is included in the still region, not the motion region, so that the data completely different therefrom is interpolated.

It has been proposed to store signals of various fields in the interlaced signal and perform the determination using not only the frame motion information of the target field but also the frame motion information of the field that precedes the target field by one field etc. to increase its determining accuracy.

According to such the determination using not only the frame motion information of the target field but also the frame motion information of the field that precedes the target field by one field etc., however, it is necessary to store signals of various fields in the interlaced signal. This causes memory capacity in storage device that is installed to be more increased, thus to enlarge a circuit scale.

The present invention alleviates the problems as mentioned above. It is an object of the present invention to provide an apparatus and a method for determining image region, and the like by which determining accuracy of determining that a target pixel position is included in either a motion region or a still region is increased with memory capacity in storage device that is installed being prevented from being vastly increased.

SUMMARY OF THE INVENTION

According to the present invention, the foregoing object is attained by an apparatus for determining image region. The apparatus comprises first determining device for determining that a target pixel position is included in any one of a motion region and a still region by using items of pixel data on first and second pixel positions arranged in a time direction, the first and second pixel positions corresponding to the target pixel position. The apparatus also comprises storage device for storing history information on a determined result of the first determining device. The apparatus further comprises second determining device for finally determining that the target pixel position is included in any one of the motion region and the still region, based on the history information on the determined result of a past predetermined time, the history information being stored in the storage device, the determined result corresponding to the target position, and the determined result of the first determining device.

According to an aspect of the present invention, a method for determining image region is provided. The method comprises first determining step of determining that a target pixel position is included in any one of a motion region and a still region by using items of pixel data on first and second pixel positions arranged in a time direction, the first and second pixel positions corresponding to the target pixel position. The method also comprises storage step of storing in a storage device history information on a determined result of the first determining step. The method further comprises second determining step of finally determining that the target pixel position is included in any one of the motion region and the still region, based on the history information on the determined result of a past predetermined time, the history information being stored in the storage device, and the determined result of the first determining step.

According to another aspect of the present invention, an apparatus for processing an image signal in which pixel data of interpolation pixel position in an interlaced signal is generated based on a determined result that the interpolation pixel position is included in any one of a motion region and a still region and the interlaced signal is converted into a progressive signal is provided.

The apparatus comprises first determining device for determining that the interpolation pixel position is included in any one of a motion region and a still region by using items of pixel data on first and second pixel positions arranged in a time direction, the first and second pixel positions corresponding to the interpolation pixel position. The apparatus also comprises storage device for storing history information on a determined result of the first determining device. The apparatus further comprises second determining device for finally determining that the interpolation pixel position is included in any one of a motion region and a still region, based on the history information on the determined result of a past predetermined time, the history information being stored in the storage device, the determined result corresponding to the interpolation position, and the determined result of the first determining device.

According to further aspect of the present invention, a method for processing an image signal in which pixel data of interpolation pixel position in an interlaced signal is generated based on a determined result that the interpolation pixel position is included in any one of a motion region and a still region and the interlaced signal is converted into a progressive signal, is provided.

The method comprises first determining step of determining that the interpolation pixel position is included in any one of a motion region and a still region by using items of pixel data on first and second pixel positions arranged in a time direction, the first and second pixel positions corresponding to the interpolation pixel position. The method also comprises storage step of storing history information on a determined result of the first determining step. The method further comprises second determining step of finally determining that the interpolation pixel position is included in any one of a motion region and a still region, based on the history information on the determined result of a past predetermined time, the history information being stored in the storage device, the determined result corresponding to the interpolation position, and the determined result of the first determining step.

Thus, according to the invention, it is determined that the target (interpolation) pixel position is included in either a motion region or a still region by using the items of pixel data of the first and second pixel positions, which are arranged in a time (field or frame) direction, corresponding to the target (interpolation) pixel position. For example, obtained is a difference absolute value between pixel data of the first pixel position and that of the second pixel position. This difference absolute value is then compared with a predetermined threshold value so that a determined result of this time can be obtained.

History information on the determined result(s) is stored in the storage device. For example, this history information relates to the determined result itself of predetermined time(s) in a pixel position, which corresponds to the target pixel position. Further, for example, it relates to a consecutive time of determination accompanying the determined result that the target (interpolation) pixel position is included in the still region, which is obtained from the determined result of the predetermined time(s) in a pixel position, which corresponds to the target pixel position. In this case, when the last determined result indicates that it is included in a still region, the consecutive time is incremented by one if the consecutive time prior to the last one indicates no maximum value (the predetermined time(s)). If the consecutive time prior to the last one indicates a maximum value, this consecutive time is kept to the same value. Alternatively, when the last determined result indicates that it is included in a motion region, the consecutive time is set to zero.

Further, it is finally determined that the target pixel position is included in either the motion region or the still region, based on the determined result obtained from the determination using pixel data of the first and second pixel positions in the time direction that correspond to the above target position and the history information, which is stored in the storage device, on the determined result of past predetermined time (s). For example, if the history information relates to a consecutive time of determination accompanying the determined result that the target pixel position is included in the still region, as described above, it is finally determined that the target pixel position is included in the still region when the consecutive time exceeds the predetermined value or is the same as it.

Thus, according to the invention, it is finally determined that the target pixel position is included in either a motion region or a still region, based on the determined result of the target pixel position and the history information on the determined result, which corresponds to the target pixel position, of past predetermined time(s). This allows determining accuracy to be increased. In the storage device, the history information of the determined result is stored, thereby preventing memory capacity of the memory device from increasing vastly because the memory device stores no pixel data on many fields as it is.

Alternatively, the second determining device finally determines that the target pixel position is included in either a motion region or a still region, based on first history information, which is stored in the storage device, on a first determined result of past predetermined time(s), the first determined result corresponding to the target pixel position, and second determined result of said first determining device together with second history information, which is stored in the storage device, on a third determined result of past predetermined time(s), which corresponds to at least one of other pixel positions included in a predetermined region set in a space direction, the predetermined region including said target pixel position. For example, if the history information relates to a consecutive time of determination accompanying the determined result that the target pixel position is included in the still region, as described above, it is determined that the target pixel position is included in the still region when all of the consecutive times of determination accompanying a determined result that the target pixel position and said at least one of other pixel positions are respectively included in the still region are at least a predetermined value.

Thus, finally determining that the target pixel position is included in either a motion region or a still region by using the history information of such other pixel positions as well allows the determining accuracy to be enhanced. If the determining accuracy is not required as to be such the case, setting the threshold value of the above consecutive time used for determining that the target pixel position is included in a still region to be smaller allows a response speed for determining that it is included in a still region to be enhanced.

According to the invention, it is finally determined that the target (interpolation or the like) pixel position is included in either a motion region or a still region, based on the determined result of the target pixel position and the history information on the determined result, which corresponds to the target pixel position, of past predetermined time(s). This allows determining accuracy to be increased with memory capacity of the memory device being prevented from increasing vastly.

According to the invention, it is finally determined that the target pixel position is included in either a motion region or a still region by using the history information on the determined results of past predetermined times corresponding to at least one of other pixel positions included in a predetermined region set in a space direction, which includes the target pixel position, thereby allowing the determining accuracy to be further enhanced.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTIION OF THE DRAWINGS

FIG. 8 is a diagram for illustrating determination by using a region.

DETAILED DESCRIPTION OF PREFERRED EMBODIMENTS

Figure 1:
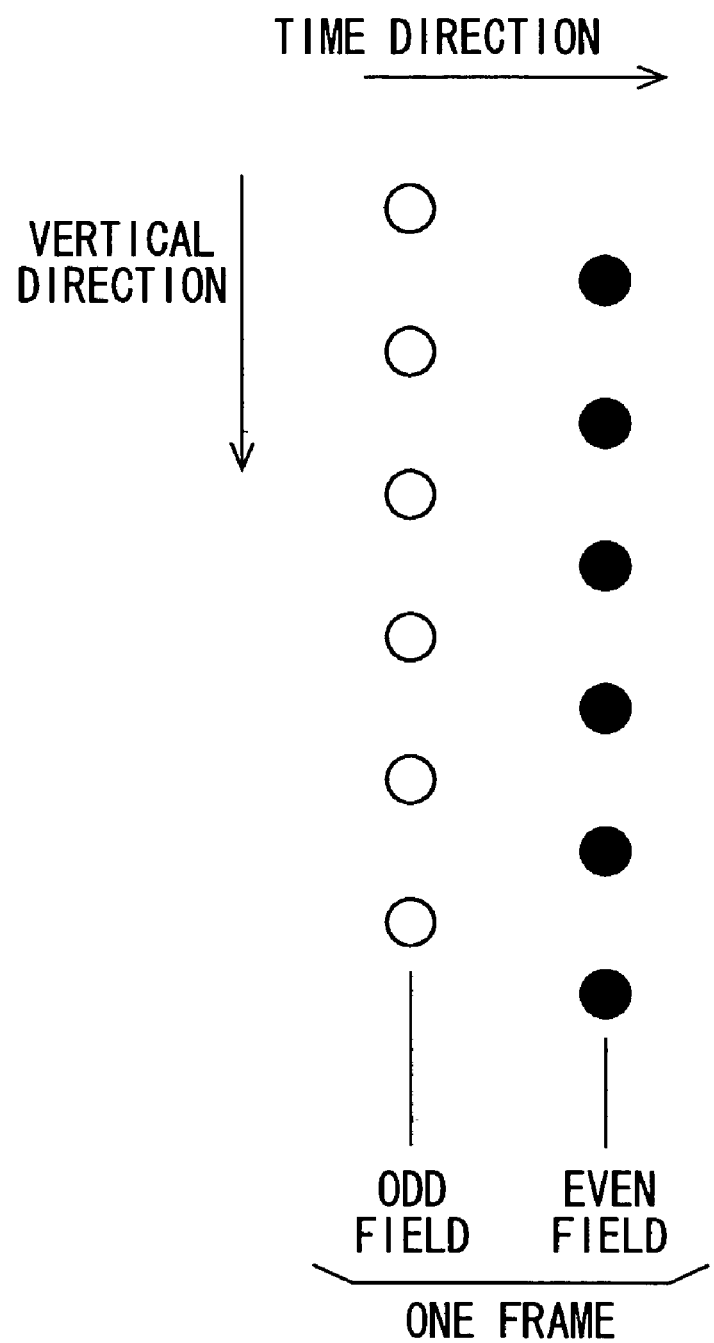
FIG. 1 is a diagram for illustrating an interlaced signal.
Figure 2:
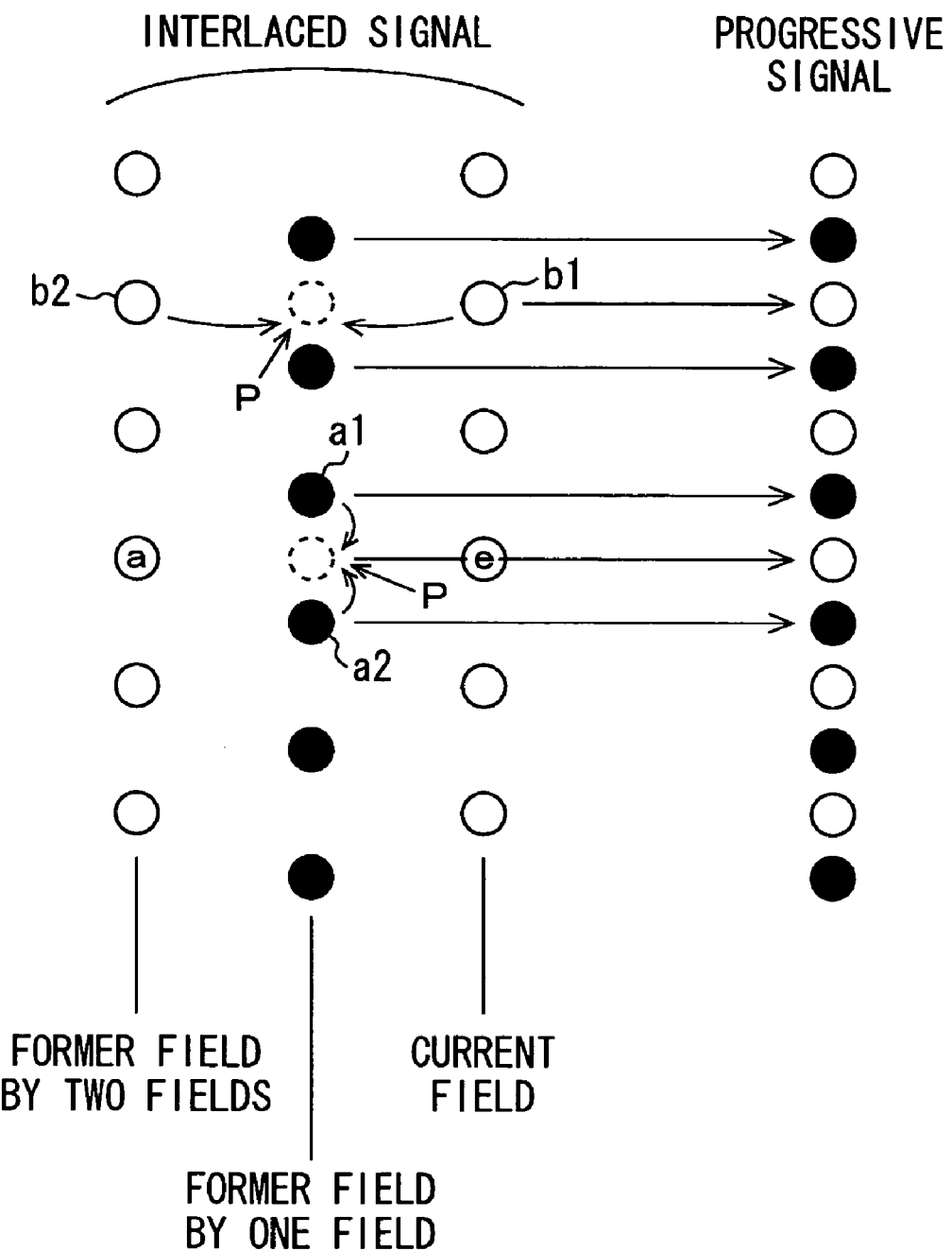
FIG. 2 is a diagram for illustrating processing of conventional IP conversion.
Figure 3:
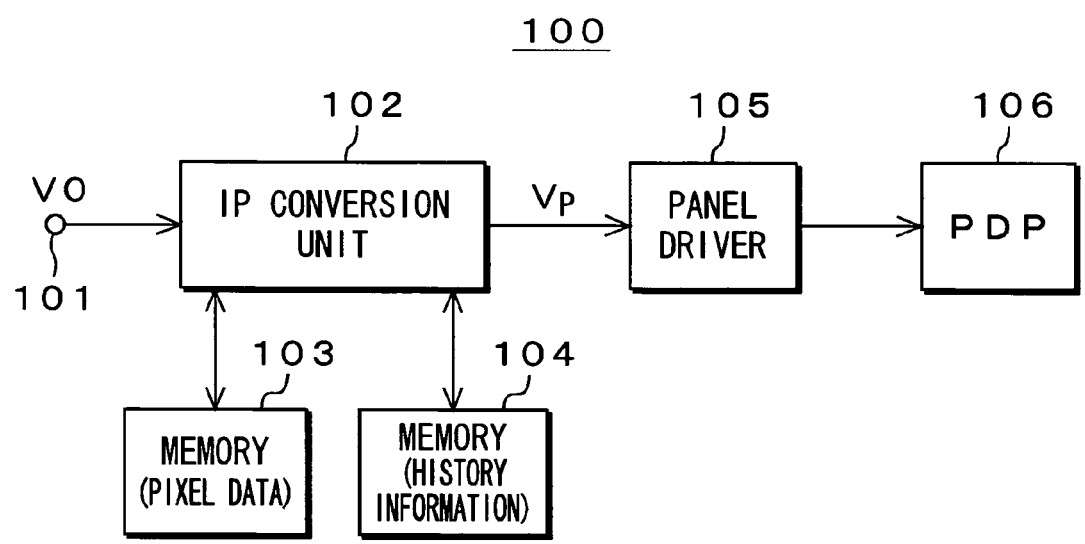
FIG. 3 is a block diagram for showing a configuration of an embodiment of image display apparatus according to the invention.

The embodiments according to the invention will now be described in detail with reference to the drawings. FIG. 1 shows a configuration of an embodiment of image display apparatus 100 according to the invention.

The image display apparatus 100 comprises an input terminal 101 for receiving an image signal V0 of interlaced signal, and an IP conversion unit 102 for converting the interlaced image signal V0 into image signal Vp of progressive signal. The IP conversion unit 102 connects memories (storage devices) 103 and 104.

The memory 103 has a memory capacity that is capable of storing pixel data of at least 2 fields and functions as being delay means for delaying it a period of one field or two fields. The memory 104 stores history information of past predetermined time(s) of a determined result RS1 that it is included in either a motion region or a still region, which corresponds to each interpolation pixel position of odd and even fields in the interlaced signal. In this embodiment, the history information relates to a consecutive time of the determination accompanying the determined result that it is included in the still region.

The image display apparatus 100 comprises a plasma display panel (PDP) 106 as a display device and a panel driver 105 for driving the PDP 106 based on the image signal Vp obtained in the IP conversion unit 102 to display an image based on the image signal Vp on a screen of the PDP106.

The following will describe operations of the image display apparatus 100 shown in FIG. 1. The input terminal receives the interlaced image signal V0 to supply the IP conversion unit 102 with the image signal V0. In the IP conversion unit 102, pixel data of interpolation pixel position in the image signal V0 is generated based on a determined result that the interpolation pixel position is included in either the motion region or the still region and the image signal V0 is converted into the image signal Vp of progressive signal.

The panel driver 105 receives the image signal Vp thus obtained by the conversion in the IP conversion unit 102. The panel driver 105 drives the PDP 106 based on the image signal Vp. Thereby, an image based on the image signal Vp is displayed on a screen of the PDP 106.

Figure 4:
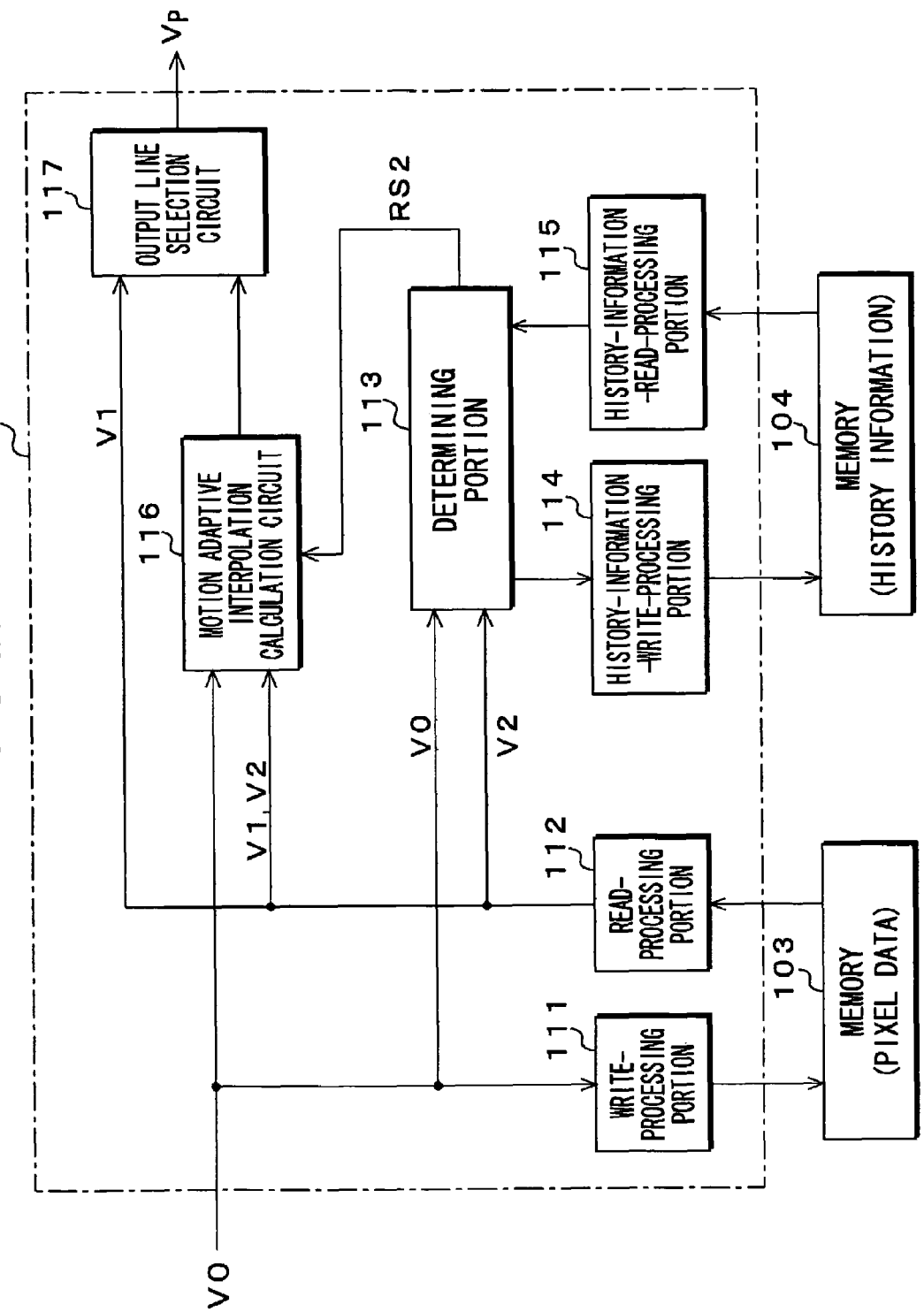
FIG. 4 is a block diagram for showing a configuration of an embodiment of IP conversion unit.

Next, the following will describe the IP conversion unit 102 more in detail. FIG. 4 shows a configuration of the IP conversion unit 102.

The IP conversion unit 102 comprises a write-processing portion 111 for writing the image signal V0 of a current field in the memory 103 and a read-processing portion 112 for reading out of the memory 103 an image signal V1 of a field that precedes the current field by one field and an image signal V2 of a field that precedes the current field by two fields (one frame). Herein, the memory 103 constitutes delay means for delaying it by one field and two fields.

The IP conversion unit 102 comprises a determining portion 113 that functions as first and second determining device for determining that it is included in either a motion region or a still region, a history-information-write-processing portion 114, and a history-information-read-processing portion 115.

Figure 5:
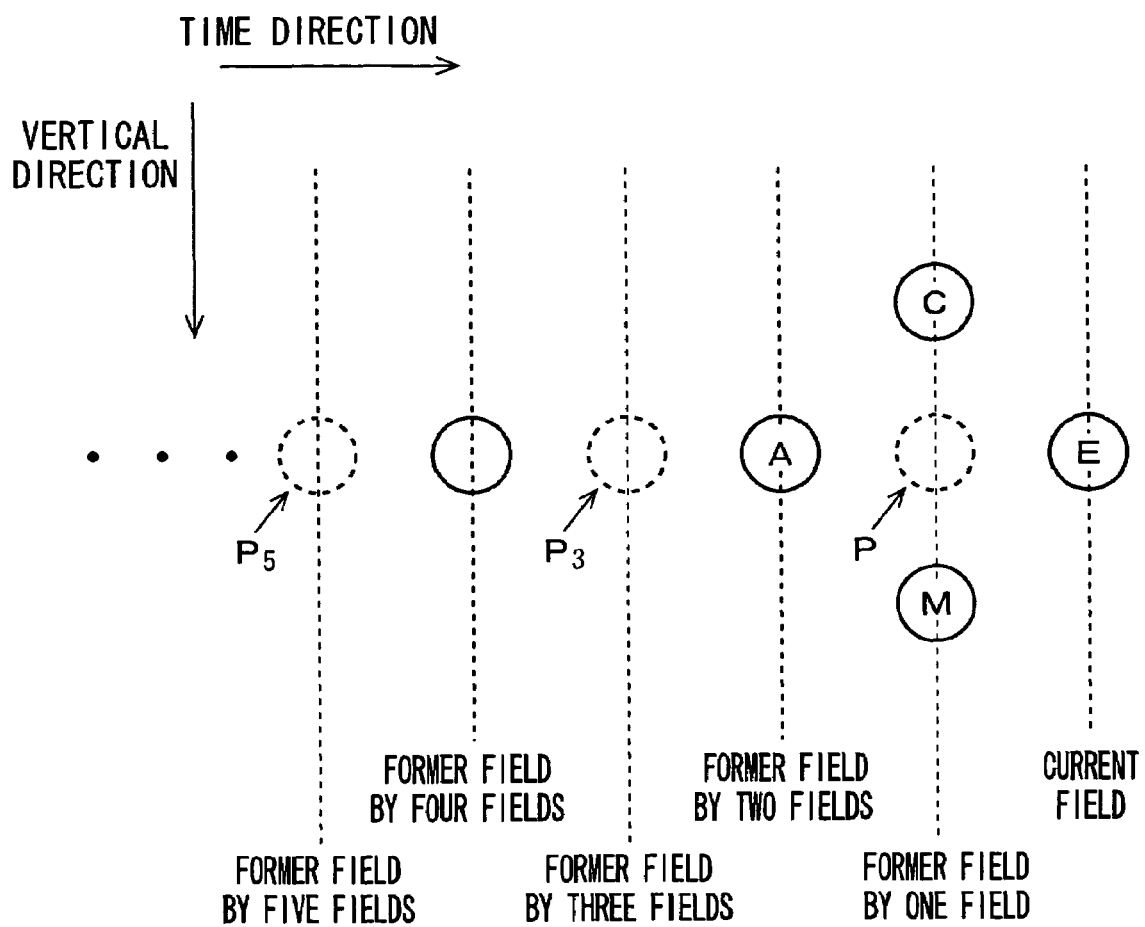
FIG. 5 is a diagram for illustrating a method for determining that a target pixel position is included in a motion region or a still region.

The determining portion 113 first determines that an interpolation pixel position P as a target pixel position, stayed at a field that precedes the current field by one field, is included in either a motion region or a still region by using an image signal V0 of the current field and the image signal V2 of a field that precedes the current field by two fields (one frame). Namely, as shown in FIG. 5, the determining portion 113 obtains a absolute value $D_{AE}$ of difference data between pixel data of pixel E of current field and that of pixel A of two fields before. These pixels A and E correspond to the interpolation pixel position P. The determining portion 113 then compares this absolute value $D_{AE}$ of difference data with a predetermined threshold value TH to obtain a determined result RS1. If $D_{AE} \geq TH$, it is determined that the interpolation pixel position P is included in a motion region. If $D_{AE} < TH$, on the other hand, it is determined that the interpolation pixel position P is included in a still region.

The history-information-read-processing portion 115 reads out of an address corresponding to the interpolation pixel position P in the memory 104 the history information on the determined result RS1 of past predetermined time(s), which corresponds to the interpolation pixel position P. Such the determined results RS1 of past predetermined times are accumulated so that they constitute the history information on the determined results RS1 of the interpolation pixel positions P3, P5 . . . , of three, five, . . . fields before, which correspond to the interpolation pixel position P, as shown in FIG. 5. Note that, in this embodiment, as described above, this history information relates to a consecutive time of determination accompanying the determined result that it is included in the still region.

The determining portion 113 finally determines that the interpolation pixel position P is included in either a motion region or a still region based the determined result RS1 of this time of the interpolation pixel position P, which is obtained as described above, and the history information on the determined result RS1 of past predetermined time(s), which is read out of the memory 104 through the history-information-read-processing portion 115, corresponding to the interpolation position P.

Namely, the determining portion 113 obtains a consecutive time CT of determination accompanying the determined result that the interpolation pixel position is included in the still region from the determined result RS1 of this time and the history information on the determined result RS1 of past predetermined time(s). If it is determined that the interpolation pixel position is included in the still region from the determined result RS1 of this time, when the past consecutive time indicated by the history information does not exceed a maximum value (which is predetermine time(s)), this past consecutive time is incremented by one so that it can be set as consecutive time CT. When the past consecutive time indicates a maximum value, it is set as consecutive time CT as it is. If it is determined that the interpolation pixel position is included in the motion region from the history information on the determined result RS1 of this time, the consecutive time is set to zero even when the past consecutive time is any number.

The determining portion 113 then compares this consecutive time CT with a predetermined threshold value th to obtain final determined result RS2 in which the interpolation pixel position P is included in either the motion region or the still region. In this case, if CT≧th, it is determined that the interpolation pixel position P is included in a still region. If CT<th, on the other hand, it is determined that the interpolation pixel position P is included in a motion region.

After the history-information-read-processing portion 115 has read out of the memory 104 the history information on the determined result RS1 of past predetermined time(s), which corresponding to the interpolation pixel position P, as described above, the history-information-write-processing portion 114 writes the history information of the determined result RS1 of predetermined time(s) in which the determined result RS1 of this time obtained in the determining portion 113 has been set as a determined result of past final one in an address of the memory 104, which corresponds to the interpolation pixel position P, as the history information on the determined result RS1 of past predetermined time(s), which corresponds to the interpolation pixel position P.

Herein, since the history information stored in the memory 104 relates to information on consecutive time(s) in the determined result that it is included in the still region, if the determined result RS1 of this time indicates that it is included in the still region, when the past consecutive time is not a maximum value (which is predetermine time(s)), this past consecutive time is incremented by one so that the incremented consecutive time can be set as the history information. When the past consecutive time is a maximum value, it is set as consecutive time as it is. The consecutive time(s) is (are) then written in the memory 104. If it is determined that the interpolation pixel position is included in the motion region from the history information on the determined result RS1 of this time, the past consecutive time is set to zero even when it is any number, which written in the memory 104.

The IP conversion unit 102 also comprises a motion adaptive interpolation calculation circuit 116. This motion adaptive interpolation calculation circuit 116 generates pixel data Dip of the interpolation pixel position P based on the determined result RS2 obtained by the determining portion 113. In this case, the motion adaptive interpolation calculation circuit 116 generates the pixel data Dip from pixel data of pixels positioned in a periphery of the interpolation pixel position P of the image signal V1 of one field before that is positioned the interpolation pixel position P when the determined result RS2 indicates that it is included in the motion region. When the determined result RS2 indicates that it is included in the still region, it generates the pixel data Dip from the pixel data of the pixels of the image signal V0 of current field and the image signal V2 of two fields before, the pixels being positioned in a periphery of the interpolation pixel position P.

For example, the motion adaptive interpolation calculation circuit 116 generates the pixel data Dip as an average value of the pixel data of the pixels C, M that are arranged in the lines before and after the line in which the interpolation pixel position stays, as shown in FIG. 5, when the determined result RS2 indicates that it is included in the motion region. The motion adaptive interpolation calculation circuit 116, on the other hand, generates the pixel data Dip as an average value of the pixel data of the pixels E, A that are arranged in the line of the current field and the two fields before, which correspond to the interpolation pixel position P, as shown in FIG. 5, when the determined result RS2 indicates that it is included in the still region. Thus, the motion adaptive interpolation calculation circuit 116 successively generates the pixel data Dip as described above in each interpolation pixel position P in each interpolation line in a vertical direction to create a signal each interpolation line.

The IP conversion unit 102 further comprises an output line selection circuit 117 for taking out signals of each line of the image signal V1 of one field before that is read out of the memory 103 through the read-processing portion 112 and signals of each interpolation line generated by the motion adaptive interpolation calculation circuit 116, one after the other, to obtain image signal Vp of progressive signal.

The following will describe operations of the IP conversion unit 102.

Interlaced image signal V0 (image signal of current field) is supplied to the memory 103 through the write-processing portion 111 so that the memory 103 can store the image signal V0. Image signals V1 and V2, which respectively precede the image signal V0 by one field and two fields, are read out of the memory 103 through the read-processing portion 112.

The image signal V0 of current field and the image signal V2 of two fields (one frame) before are supplied to the determining portion 113. In the determining portion 113, it is first determined that an interpolation pixel position P to be positioned in a field preceded by one field from the current field is included in either a motion region or a still region by using the image signal V0 of current field and the image signal V2 of two fields (one frame) before. Thus, in the determining portion 113, obtained is an absolute value $D_{AE}$ of difference data between pixel data of pixel E of current field and that of pixel A of two fields before. These pixels A and E correspond to the interpolation pixel position P positioned in a field preceded by one field from the current field. The determining portion 113 then compares this absolute value $D_{AE}$ with a predetermined threshold value TH to obtain a determined result RS1 of this time.

Then, in the determining portion 113, it is finally determined that the interpolation pixel position P is included in either a motion region or a still region based on the determined result RS1 of this time obtained as described above for the interpolation pixel position P and the history information on the determined result RS1 of past predetermined time(s) that is read out of the memory 104 through history-information-read-processing portion 115. The determined result RS1 corresponds to the interpolation pixel position P.

Namely, in the determining portion 113, a consecutive time CT of determination accompanying the determined result that the interpolation pixel position P is included in the still region is obtained from the determined result RS1 of this time and the history information on the determined result RS1 of past predetermined time(s). This consecutive time CT is then compared with a predetermined threshold value th so that a final determined result RS2 indicating that the interpolation pixel position P is included in either the motion region or the still region can be obtained.

The history-information-read-processing portion 115 has read out of the memory 104 the history information on the determined result RS1 of past predetermined time(s), which corresponds to the interpolation pixel position P, and then, by the history-information-write-processing portion 114, the history information on the determined result RS1 of past predetermined time(s) in which the determined result RS1 of this time obtained in the determining portion 113 has been set as a determined result of last past one is written in an address of the memory 104, which corresponds to the interpolation pixel position P, as the history information on the determined result RS1 of past predetermined time(s), which corresponds to the interpolation pixel position P.

The determined result RS2 obtained by the determining portion 113 is supplied to the motion adaptive interpolation calculation circuit 116. To the motion adaptive interpolation calculation circuit 116, the image signal V0 of current field, the image signals V1 and V2, which are read out of the memory 103, of one field before and two fields (one frame) before, respectively, are also supplied. In the motion adaptive interpolation calculation circuit 116, generated is the pixel data Dip of the interpolation pixel position P based on the determined result RS2.

Namely, in the motion adaptive interpolation calculation circuit 116, the pixel data Dip is generated from the pixel data of the pixels that are positioned in a periphery of the interpolation pixel position P of the image signal V1 that precedes by one field from a current field when the determined result RS2 indicates that it is included in the motion region. When the determined result RS2 indicates that it is included in the still region, the pixel data Dip is generated from the pixel data of the pixels of the image signal V0 of current field and the image signal V2 of two fields before, the pixels being positioned in a periphery of the interpolation pixel position P.

For example, in the motion adaptive interpolation calculation circuit 116, the pixel data Dip is generated as an average value of the pixel data of the pixels C, M that are arranged in the lines before and after the line in which the interpolation pixel position P stays when the determined result RS2 indicates that it is included in the motion region. On the other hand, the pixel data Dip is generated as an average value of the pixel data of the pixels E, A that are arranged in the lines of the current field and the two fields before, which correspond to the interpolation pixel position P, when the determined result RS2 indicates that it is included in the still region.

In the motion adaptive interpolation calculation circuit 116, as described above, the pixel data Dip is generated on each interpolation pixel position of each interpolation line in a vertical direction, thus generating signals of each interpolation line consecutively. The signals of each interpolation line thus generated in the motion adaptive interpolation calculation circuit 116 are supplied to the output line selection circuit 117. Signals of each line of the image signal Vi of one field before read out of the memory 103 are also supplied to the output line selection circuit 117. In the output line selection circuit 117, the signals of each line of the image signal Vi of one field before and the signals of each interpolation line corresponding to it are taken out, one after the other, thereby resulting in double number of lines to obtain image signal Vp of progressive signal. This image signal Vp is output as the output signal from the IP conversion unit 102.

According to the IP conversion unit 102 shown in FIG. 4, determining that the interpolation pixel position P is included in either a motion region or a still region is finally performed based on the determined result RS1 of this time for the interpolation pixel position P and the history information on the determined result RS1 of past predetermined time(s) that corresponds to the interpolation pixel position P. If compared with a case of determining that the interpolation pixel position P is included in either a motion region or a still region based on only the determined result RS1 of this time, this invention allows determining accuracy to be improved, thereby generating very well the pixel data Dip of the interpolation pixel position P and thus, obtain image signal Vp of progressive signal.

In the IP conversion unit 102 shown in FIG. 4, the memory 104 stores the history information of the determined result RS1 of past predetermined time(s) in each interpolation pixel position of odd and even fields in interlaced signal, while it does not store the pixel data relative to the determined result of past predetermined time(s) as it is.

This prevents memory capacity of the memory 104 from increasing vastly. If storing the history information on the determined result RS1 of past three times, for example, a maximum value of the consecutive time is three when the history information relates to a consecutive time of the determined result indicating that it is included in the still region, as described above. This allows it to be sufficient therefor to set the memory capacity of the memory 104 to two bits for each interpolation pixel position.

Figure 6:
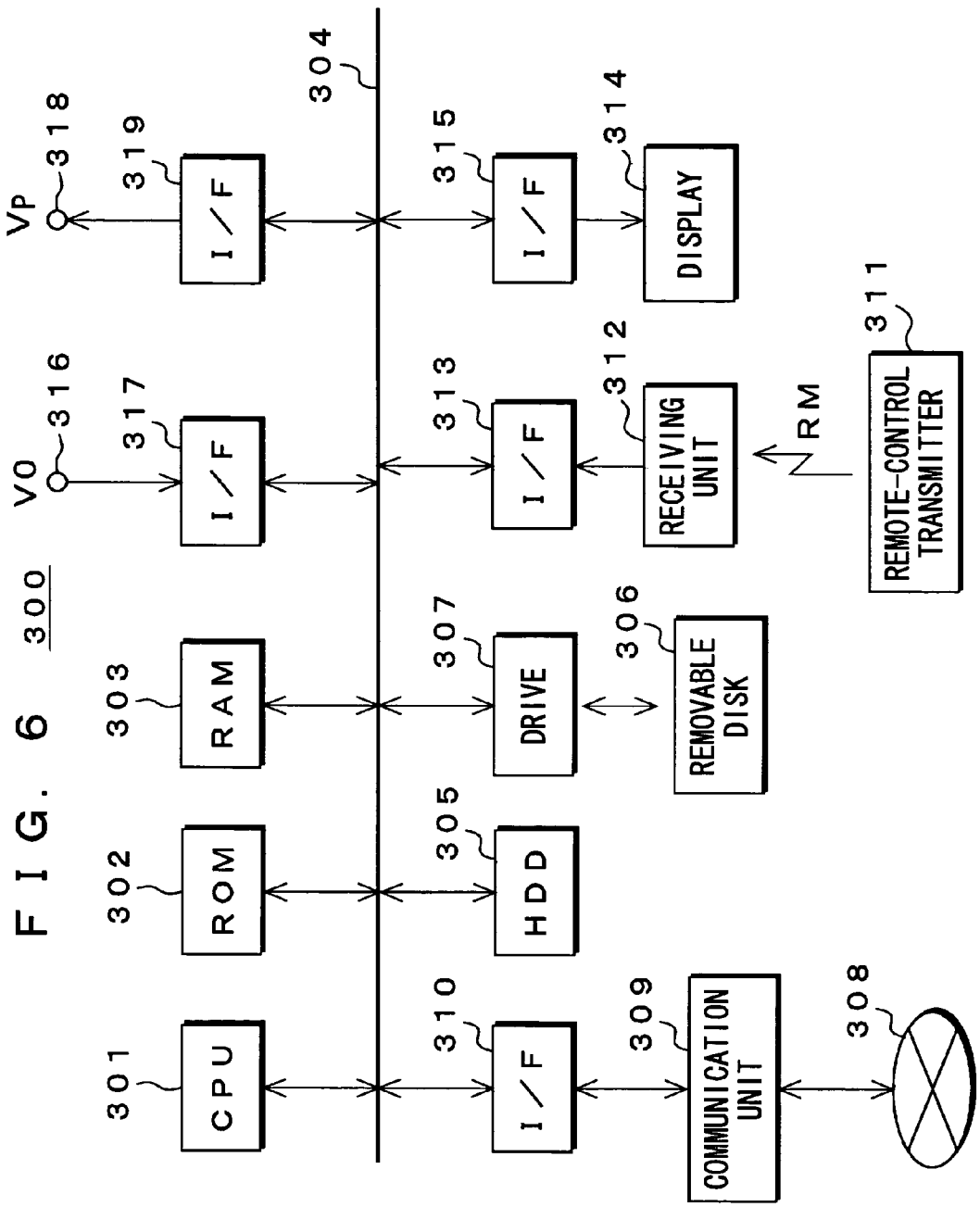
FIG. 6 is a block diagram for showing a configuration of an apparatus for processing image signal that is implemented by software.

Processing in the IP conversion unit 102 shown in FIG. 4 can be implemented by software, for example, in an apparatus 300 for processing image signal as shown in FIG. 6.

The following will describe the apparatus 300 for processing image signal. The apparatus 300 for processing image signal comprises CPU 301 for controlling operations of the apparatus overall, a read only memory (ROM) 302 for storing operation program of the CPU 301, etc., a random access memory (RAM) 303 constituting operation area of the CPU 301. These CPU 301, ROM 302, and RAM 303 are respectively connected to bus 304.

The apparatus 300 for processing image signal also comprises a hard disk drive (HDD) 305, a drive 307 for driving a removable disk 306. These HDD 305 and drive 307 are respectively connected to the bus 304.

The apparatus 300 for processing image signal further comprises a communication unit 309 for communicating with a communication network such as the Internet by a cable or wireless. This communication unit 309 is also connected to the bus 304 via an interface 310 thereof.

The apparatus 300 for processing image signal additionally comprises a user interface. The user interface includes a receiving unit 312 for receiving a remote control signal RM from a remote-control transmitter 311, and a display 314 including a liquid crystal display (LCD). The receiving unit 312 is also connected to the bus 304 via an interface 313 thereof. Similarly, the display 314 is also connected to the bus 304 via an interface 315 thereof.

The apparatus 300 for processing image signal still further comprises an inputting terminal 316 for receiving the image signal V0 of interlaced signal and an outputting terminal 318 for outputting the image signal Vp of progressive signal. The inputting terminal 316 is also connected to the bus 304 via an interface 317 thereof. Similarly, the outputting terminal 318 is also connected to the bus 304 via an interface 319 thereof.

Instead of storing the operation program and like in the ROM 302 beforehand, such the operation program and the like can be downloaded from the communication network 308 such as the Internet via the communication unit 309, thereby storing them in HDD 305 and/or RAM 303 and using them. Alternatively the operation program and the like can be provided with the removable disk 306.

Instead of receiving the image signal V0 to be processed through the inputting terminal 316, the signal V0 can be stored in the HDD 305 beforehand, downloaded from the communication network 308 such as the Internet via the communication unit 309, or be provided with the removable disk 306. Instead of outputting the processed image signal Vp through the outputting terminal 318 or concurrently therewith, the image signal Vp can be supplied to the display 314 to display an image, stored in the HDD 305, transmitted to the communication network 308 such as the Internet via the communication unit 309, or stored in the removable disk 306.

Figure 7:
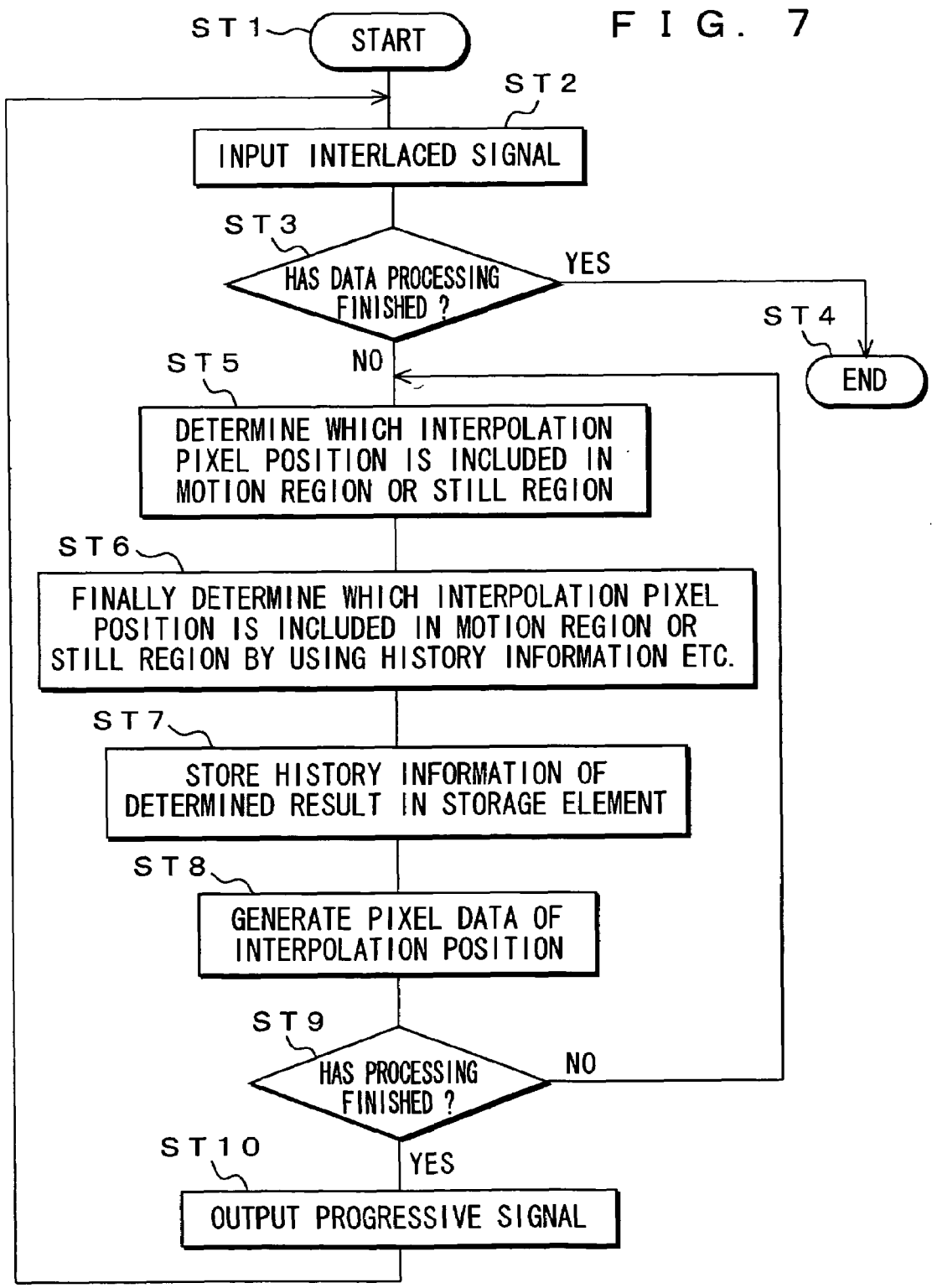
FIG. 7 is a flowchart for showing a process of IP conversion processing.

The following will describe processing process for the IP conversion in the apparatus 300 for processing image signal with reference to a flowchart shown in FIG. 7.

First, at step ST1, the process starts processing, and at step ST2, it inputs one frame or one field of the image signal V0 as interlaced signal into the apparatus. If this image signal V0 is inputted trough the inputting terminal 316, the signal V0 is temporarily stored in the RAM 303. If this image signal V0 has been already stored in the HDD 305, the signal CV0 is read out of the HDD 305 and is then stored the RAM 303 temporarily. If this image signal V0 is provided with the removable disk 306, the signal V0 is read out of the removable disk 306 by the drive 307 and is then stored in the RAM 303 temporarily.

At step ST3, it decides which processing of all the frames or fields of the image signal V0 has finished. If the processing has finished, the process ends the processing at step ST4. Otherwise, it goes to step ST5.

At this step ST5, it is determined that the interpolation pixel position P positioned in a field that precede a current field by one field is included in either a motion region or a still region by using the image signal V0 of the current field and the image signal V2 of a field that precede the current field by two field. Namely, in this step ST5, obtained is an absolute value $D_{AE}$ of difference data between pixel data of pixel E of current field and that of pixel A of two fields before. These pixels A and E correspond to the interpolation pixel position P positioned in a field preceded by one field from the current field. This absolute value $D_{AE}$ is then compared with a predetermined set threshold value TH so that a determined result RS1 of this time can be obtained.

At step ST6, it is finally determined that the interpolation pixel position P is included in either the motion region or the still region based on the determined result RS1 of this time of the interpolation pixel position P obtained at step ST5 and the history information on the determined result RS1 of past predetermined time(s) that is stored in the memory 104, the determined result RS1 corresponding to the interpolation pixel position P.

Namely, in the step ST6, a consecutive time CT of determination accompanying the determined result that the interpolation pixel position P is included in the still region is obtained from the determined result RS1 of this time and the history information on the determined result RS1 of past predetermined time(s). This consecutive time CT is then compared with a predetermined threshold value th so that a final determined result RS2 in which the interpolation pixel position P is included in either the motion region or the still region can be obtained.

Next, at step ST7, the history information on the determined result RS1 of past predetermined time(s) in which the determined result RS1 of this time obtained at step ST5 has been set as a determined result of last past one is written in an address, which corresponds to the interpolation pixel position P, of the RAM 303 as storage device, as the history information on the determined result RS1 of past predetermined time(s), which corresponds to the interpolation pixel position P. In this case, since the history information relates to the consecutive time of determination accompanying the determined result that the interpolation pixel position is included in the still region, if it is determined that the interpolation pixel position is included in the still region from the determined result RS1 of this time, when the past consecutive time does not exceed a maximum value (which is predetermine time (s)), this past consecutive time is incremented by one so that it can be set as consecutive times in the history information. When the past consecutive time is a maximum value, it is set as consecutive time as it is. The consecutive time is written into the RAM 303. If it is determined that the interpolation pixel position is included in the motion region from the history information on the determined result RS1 of this time, the consecutive time is set to zero even when the past consecutive time is any number. The consecutive time is also written into the RAM 303.

Next, at step ST8, the pixel data Dip of the interpolation pixel position P is generated from the image signal V0 of the current field and the image signals V1 and V2 of fields that precedes the current field by one field and two fields, respectively, based on the determined result RS2 obtained at step ST7. Namely, in this step ST8, when the determined result RS2 indicates that it is included in the motion region, the pixel data Dip is generated from pixel data of the pixels that are positioned in a periphery of the interpolation pixel position P of the image signal V1 of a field that precedes the current field by one field, in which the interpolation pixel position P is positioned. When the determined result RS2 indicates that it is included in the still region, the pixel data Dip is generated from the pixel data of the pixels of the image signal V0 of current field and the image signal V2 of two fields before, the pixels being positioned in a periphery of the interpolation pixel position P.

Next, at step ST19, it is determined which the processing of generating the pixel data Dip has finished in all the interpolation lines on the image signal V1 of a field that precedes the current field by one field. If the processing has not yet finished, the process returns to step ST5 to shift processing of next interpolation pixel position. If the processing has finished at step ST9, it goes to step ST10. In this step ST10, the image signal Vp of progressive signal that corresponds to the image signal V0 input at step ST2 is output. In this case, the signals of each line of the image signal V1 and the signals of each interpolation line corresponding to it are read out of the RAM 303, one after the other, thereby resulting in double number of lines to obtain image signal Vp of progressive signal.

This output includes output of the image signal Vp through the outputting terminal 318, storage of the image signal Vp in the HDD 305, storage of the image signal Vp in the removable disk 306 using the drive 307, supply the display 314 with the image signal Vp to display an image due to it, and transmission of the image signal Vp to the network 308 via the communication unit 309.

After processing at step ST10, the process goes back to step ST2 to execute input processing of one frame or one field of the image signal V0 as interlaced signal into the apparatus and the similar processing as described above are repeated.

Thus, the processing along the flowchart shown in FIG. 7 allows the image signal V0 of interlaced signal to be processed to convert it into the image signal Vp of progressive signal.

Although the invention has been described according to the above embodiment that the determining portion 113 of the IP conversion unit 102 finally determines that the interpolation pixel position P is included in either a motion region or a still region based on the determined result RS1 of this time and the history information on the determined result RS1 of past predetermined time(s), it can determine that the interpolation pixel position P is included in either a motion region or a still region finally by using history information on the determined result RS1 of past predetermined time(s), which is stored in the memory 104, corresponding to at least one pixel position other than the interpolation pixel position P that is included in a predetermined spatial region (a region having horizontal and vertical directions) including the interpolation pixel position P. This allows determining accuracy in the determining portion 113 to be enhanced.

In this embodiment, for example, if the history information relates to consecutive time(s) of determination accompanying the determined result that it is included in a still region, the determining portion 113 determines that the interpolation pixel position P is included in the still region when the consecutive time CT of determination accompanying the determined result that the interpolation pixel position P is included in the still region obtained on the basis of the determined result RS1 of this time and the history information on the determined result RS1 of past predetermined time(s) exceeds a threshold value th, and the consecutive time of determination accompanying the determined result that the interpolation pixel position P is included in the still region obtained on the basis of the history information, which has been stored in the memoryb104, corresponding to the above at least one other pixel position other than the interpolation pixel position P exceeds a threshold value th.

In FIG. 8, regions AR1 and AR2 are shown as an example of the predetermined spatial region including the interpolation pixel position P. In the region AR1, in addition to the interpolation pixel position P, positions of two pixels C, M that adjoin it vertically are included. In the region AR2, in addition to the interpolation pixel position P, positions of eight pixels C, M, b, d, g, i, l, n that adjoin it horizontally and vertically are included. AR2 includes other pixel positions more than AR1 includes. This allows determining accuracy to be enhanced.

Thus, determining that the interpolation pixel position P is included in either a motion region or a still region finally by using the history information of such other pixel positions as well allows the determining accuracy to be enhanced, as described above. If the determining accuracy is not required as to be such the case, setting the threshold value th to be smaller allows a response speed for determining that it is included in a still region to be enhanced. In such a case, the larger the region, namely, the more the number of other pixel position, the smaller the threshold value can be set, thereby enhancing the response speed.

According to the embodiments, the determining portion 113 has obtained the consecutive time CT of determination accompanying the determined result that the interpolation pixel position P is included in the still region from the determined result RS1 of this time and the history information on the determined result RS1 of past predetermined time and compared the consecutive time(s) CT with a threshold value th to obtain the determined result RS2.

If, however, the history information on the determined result RS1 of past predetermined time(s) corresponding to the interpolation pixel position P is read in the history-information-read-processing portion 115 after the history information, which has been stored in the memory 104, on the determined result RS1 of past predetermined time(s) corresponding to the interpolation pixel position P has been updated in the history-information-write-processing portion 114, the determining portion 113 can use, as the consecutive time CT, the consecutive time indicated in the history information thus read out as it is.

Although, in the above embodiments, the history information of the determined result RS1 of past predetermined time(s) has included the consecutive time(s) of determination accompanying the determined result that the interpolation pixel position P is included in the still region, the history information can include the determined result RS1 of past predetermined time(s) as it is. This results in no much increase in memory capacity because the memory does not store pixel data relative to the determined result of past predetermined time(s) as it is. For example, if storing the determined result RS1 of past three times as it is, the determined result RS1 of each time can be expressed by one bit. Thus, the memory 104 is required to have memory capacity of three bits for each interpolation pixel position.

Although, in the above embodiments, the memories 103, 104 have been provided in outside of the IP conversion unit 102, these memories can be provided in inside of the IP conversion unit 102.

The invention has been described in detail with reference to specific embodiments of the invention in a case where it is determined that the interpolation pixel position of interlaced signal is included in either a motion region or a still region. It should be understood that the invention is not limited to these embodiments and that the invention can be applied equally well to other case where it is determined that the optional pixel position of progressive signal is included in either a motion region or a still region.

Thus have been described an apparatus and a method for determining that a target position of the image signal is included in either a motion region or a still region, and an apparatus and a method for processing an image signal. While the foregoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

The present application contains subject matter related to Japanese patent application No. JP 2003-385226, filed in the JPO on Nov. 14, 2003, the entire contents of which being incorporated herein by reference.

What is claimed is:

1. An apparatus for determining image region, said apparatus comprising:

first determining device for determining whether a target pixel position is included in a motion region or a still region by using items of pixel data on first and second pixel positions arranged in a time direction, said first and second pixel positions corresponding to the target pixel position;

storage device for storing history information on a determined result of said first determining device comprising information representing that the target pixel position is determined as being in or not being in a still region; and second determining device for finally determining that said target pixel position is included in the motion region or the still region, based on the history information on the determined result of a past predetermined time, said history information being stored in the storage device, said determined result corresponding to the target position, and said determined result of the first determining device, wherein the history information comprises a count representing number of consecutive times that the target pixel is determined to fall either in a motion region or in a still region and the value of the count is set to a predetermined value upon interruption of consecutive times that the targeted pixel is determined to fall either in a motion region or in a still region.

2. The apparatus for determining image region according to claim 1,
wherein the history information on a determined result of a past predetermined time, said history information being stored in the storage device, includes information on a consecutive time of determination accompanying the determined result that the target pixel position is included in the still region; and
wherein said second determining device determines that the target pixel position is included in the still region when the consecutive time of determination accompanying the determined result that the target pixel position is included in the still region is at least a predetermined value.

3. The apparatus for determining image region according to claim 1,
wherein said second determining device finally determines that said target pixel position is included in any one of the motion region and the still region, based on first history information on a first determined result of a past predetermined time, said first history information being stored in the storage device, said first determined result corresponding to said target pixel position, and second determined result of said first determining device together with second history information on a third determined result of a past predetermined time, said second history information being stored in the storage device, said third determined result corresponding to at least one of other pixel positions included in a predetermined region set in a space direction, said predetermined region including said target pixel position.

4. The apparatus for determining image region according to claim 3,
wherein the first and second history information on the first and third determined results of past predetermined times, said first and second history information being stored in the storage device, includes information on a consecutive time of determination accompanying the determined result that the target pixel position is included in the still region; and
wherein said second determining device determines that the target pixel position is included in the still region when all of the consecutive times of determination accompanying a determined result that the target pixel position and said at least one of other pixel positions are respectively included in the still region are at least a predetermined value.

5. A method for determining image region, said method comprising:
first determining step of determining whether a target pixel position is included in a motion region or a still region by using items of pixel data on first and second pixel positions arranged in a time direction, said first and second pixel positions corresponding to the target pixel position;
storage step of storing in a storage device history information on a determined result of said first determining step, comprising information representing that the target pixel position is determined as being in or not being in a still region; and
second determining step of finally determining that said target pixel position is included in the motion region or the still region, based on the history information on the determined result of a past predetermined time, said history information being stored in the storage device, and said determined result of said first determining step,
wherein the history information comprises a count representing number of consecutive times that the target pixel is determined to fall either in a motion region or in a still region and the value of the count is set to a predetermined value upon interruption of consecutive times that the targeted pixel is determined to fall either in a motion region or in a still region.

6. An apparatus for processing an image signal in which pixel data of interpolation pixel position in an interlaced signal is generated based on a determined result that said interpolation pixel position is included in any one of a motion region and a still region and said interlaced signal is converted into a progressive signal, said apparatus comprising:
first determining device for determining whether said interpolation pixel position is included in a motion region or a still region by using items of pixel data on first and second pixel positions arranged in a time direction, said first and second pixel positions corresponding to the interpolation pixel position;
storage device for storing history information on a determined result of said first determining device, comprising information representing that the interpolation pixel position is determined as being in or not being in a still region; and
second determining device for finally determining that said interpolation pixel position is included in a motion region or a still region, based on the history information on the determined result of a past predetermined time, said history information being stored in the storage device, said determined result corresponding to the interpolation position, and said determined result of said first determining device,
wherein the history information comprises a count representing number of consecutive times that the target pixel is determined to fall either in a motion region or in a still region and the value of the count is set to a predetermined value upon interruption of consecutive times that the targeted pixel is determined to fall either in a motion region or in a still region.

7. The apparatus for processing an image signal according to claim 6,
wherein the history information on a determined result of a past predetermined time, said history information being stored in the storage device, includes information on a consecutive time of determination accompanying the determined result that the interpolation pixel position is included in the still region; and
wherein said second determining device determines that the interpolation pixel position is included in the still region when the consecutive time of determination accompanying the determined result that the interpolation pixel position is included in the still region is at least a predetermined value.

8. The apparatus for processing an image signal according to claim 6,
wherein said second determining device finally determines that said interpolation pixel position is included in any one of a motion region and a still region, based on first history information on a first determined result of a past predetermined time, said first history information being stored in the storage device, said first determined result corresponding to said interpolation pixel position, and second determined result of said first determining device together with second history information on a third determined result of a past predetermined time, said second history information being stored in the storage device, said third determined result corresponding to at least one of other pixel positions included in a predetermined region set in a space direction, said predetermined region including said interpolation pixel position.

9. The apparatus for processing an image signal according to claim 8, wherein the first and second history information on the first and third determined results of past predetermined times, said first and second history information being stored in the storage device, includes information on a consecutive time of determination accompanying the determined result that the target pixel position is included in the still region; and wherein said second determining device determines that the interpolation pixel position is included in the still region when all of the consecutive times of determination accompanying a determined result that the interpolation pixel position and said at least one of other pixel positions are respectively included in the still region are at least a predetermined value.

10. A method for processing an image signal in which pixel data of interpolation pixel position in an interlaced signal is generated based on a determined result that said interpolation pixel position is included in any one of a motion region and a still region and said interlaced signal is converted into a progressive signal, said method comprising:

first determining step of determining whether said interpolation pixel position is included in a motion region or a still region by using items of pixel data on first and second pixel positions arranged in a time direction, said first and second pixel positions corresponding to the interpolation pixel position;

storage step of storing history information on a determined result of said first determining step, comprising information representing that the interpolation pixel position is determined as being in or not being in a still region; and second determining step of finally determining that said interpolation pixel position is included in a motion region or a still region, based on the history information on the determined result of a past predetermined time, said history information being stored in the storage device, said determined result corresponding to the interpolation position, and said determined result of said first determining step, wherein the history information comprises a count representing number of consecutive times that the target pixel is determined to fall either in a motion region or in a still region and the value of the count is set to a predetermined value upon interruption of consecutive times that the targeted pixel is determined to fall either in a motion region or in a still region.

* * * * *